(12) United States Patent
Yamada et al.

(10) Patent No.: US 9,073,699 B2
(45) Date of Patent: Jul. 7, 2015

(54) POWDER CONVEYING DEVICE AND IMAGE FORMING APPARATUS

(71) Applicant: KYOCERA Document Solutions Inc., Osaka-shi, Osaka (JP)

(72) Inventors: Masayuki Yamada, Osaka (JP); Hidehisa Konishi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 16 days.

(21) Appl. No.: 14/115,890

(22) PCT Filed: Feb. 20, 2013

(86) PCT No.: PCT/JP2013/000923
§ 371 (c)(1),
(2) Date: Nov. 6, 2013

(87) PCT Pub. No.: WO2013/128844
PCT Pub. Date: Sep. 6, 2013

(65) Prior Publication Data
US 2014/0076691 A1 Mar. 20, 2014

(30) Foreign Application Priority Data

Feb. 29, 2012 (JP) .................................. 2012-043755
Sep. 13, 2012 (JP) .................................. 2012-201077

(51) Int. Cl.
*B65G 33/00* (2006.01)
*B65G 33/14* (2006.01)
(Continued)

(52) U.S. Cl.
CPC ............ *B65G 33/14* (2013.01); *G03G 15/0189* (2013.01); *G03G 15/0879* (2013.01); *G03G 2215/0132* (2013.01)

(58) Field of Classification Search
CPC .. B01F 7/00391; G03G 21/105; G03G 21/12; B65G 33/24; B65G 33/14
USPC .......... 198/550.1, 658, 670, 671; 399/358, 360
See application file for complete search history.

(56) References Cited

U.S. PATENT DOCUMENTS 4,634,286 A * 1/1987 Pike ............................... 198/670
4,650,312 A * 3/1987 Vineski .......................... 399/358

(Continued)

FOREIGN PATENT DOCUMENTS

JP  56-66884     6/1981
JP  2000-284594  10/2000

(Continued)

OTHER PUBLICATIONS

International Search Report of Mar. 19, 2013.

*Primary Examiner* — James R Bidwell
(74) *Attorney, Agent, or Firm* — Gerald E. Hespos; Michael J. Porco; Matthew T. Hespos

(57) ABSTRACT

A powder conveying device includes a first conveying unit, a second conveying unit, a conveying member, a powder pulverizing member, and a protective member. The first conveying unit has a lower end. The second conveying unit has one end connected to the lower end. The conveying member is disposed in the second conveying unit and includes a shaft member and a protruding portion formed around the shaft member, and conveys the powder. The powder pulverizing member is disposed in the first conveying unit so as to be able to oscillate. The protective member is attached to the powder pulverizing member and makes contact with the protruding portion of the conveying member. A contact state between the protective member and the protruding portion changes according to a rotation angle of the conveying member, and the protective member and the powder pulverizing member oscillate due to changes in the contact state.

10 Claims, 10 Drawing Sheets

(51) Int. Cl.
*G03G 15/01* (2006.01)
*G03G 15/08* (2006.01)

(56) References Cited

U.S. PATENT DOCUMENTS 4,819,578 A * 4/1989 Koiso et al. .................. 399/360
7,904,014 B2 * 3/2011 Umehara et al. ............. 399/358
8,000,644 B2 * 8/2011 Hoshino ....................... 399/358
8,270,891 B2 * 9/2012 Ogashiwa ..................... 399/360

FOREIGN PATENT DOCUMENTS

| JP | 2007-121828 | 5/2007 |
| JP | 2008-216360 | 9/2008 |
| JP | 2009-122362 | 6/2009 |

* cited by examiner

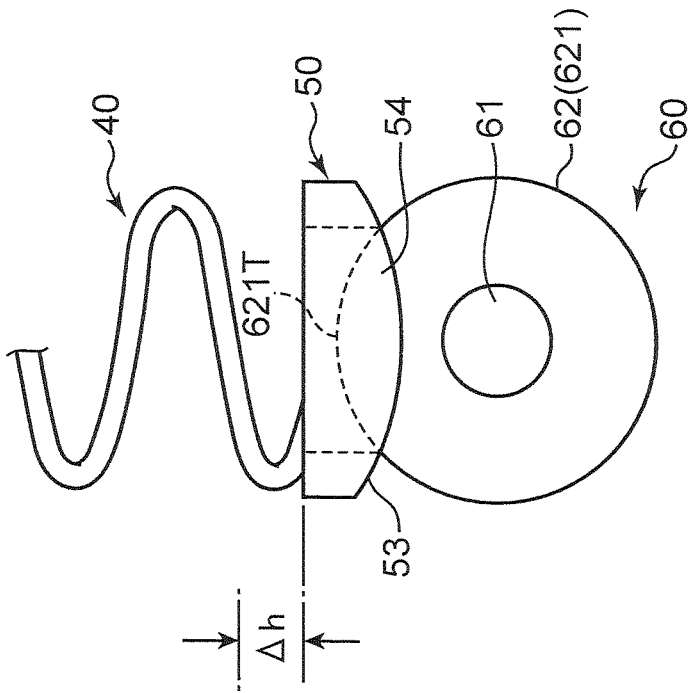
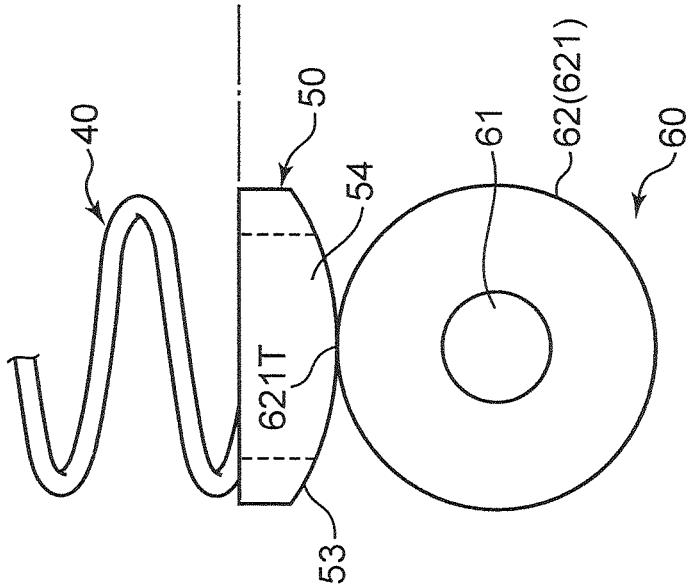

POWDER CONVEYING DEVICE AND IMAGE FORMING APPARATUS

BACKGROUND

1. Technical Field

The present invention relates to a powder conveying device that conveys powder such as toner by way of a conveying unit that conveys the powder in a first direction and a conveying unit that conveys the powder in a second direction different from the first direction, and an image forming apparatus to which the powder conveying device is adopted.

2. Background Art

An image forming apparatus such as a printer or a copying machine in which an electrophotographic system is employed includes a photosensitive drum that carries an electrostatic latent image, a developing device that supplies toner (an example of powder) to the photosensitive drum to visualize the electrostatic latent image as a toner image, and a toner container that supplies toner to the developing device. The toner image on the photosensitive drum is transferred to a sheet. In an image forming apparatus that forms a full-color image, after the toner images of respective colors are primarily transferred to an intermediate transfer belt, the toner images are secondarily transferred to the sheet. In such an image forming apparatus, it may be necessary to form a conveyance path for conveying toner in the apparatus due to a layout of various devices.

For example, when the toner container and the developing device are spaced from each other, a conveyance path for conveying new toner is formed between the toner container and the developing device. Alternatively, when residual toner collected from the circumferential surface of the photosensitive drum or the intermediate transfer belt is conveyed to a collection bottle disposed away from the collection position, a conveyance path for conveying the residual toner is necessary. Such a toner conveyance path may include a vertical conveying unit and a horizontal conveying unit connected to a lower end of the vertical conveying unit. In this case, toner freely falls along the vertical conveying unit and reaches the horizontal conveying unit. In general, a conveying screw is disposed in the horizontal conveying unit, and the falling toner is conveyed in the horizontal direction to a predetermined position by the conveying screw.

In the toner conveying unit in which the horizontal conveying unit is disposed on the rear end of the vertical conveying unit, there is a problem that toner may clump together near a communication opening (a portion that joins the horizontal conveyance path) at the lower end of the vertical conveying unit, and smooth supply of toner is disturbed. This results from the fact that the conveying screw in rotation pushes back the toner near the communication opening whereby the toner forms clumps to block the conveyance path. In order to solve this problem, Japanese Patent Application Publication No. 2008-216360 discloses a technique of attaching a distortion coil spring to the conveying screw so as to vibrate with rotation of the conveying screw.

According to the configuration of Japanese Patent Application Publication No. 2008-216360, it is possible to prevent clumping of toner in a vibration range of the distortion coil spring. However, when toner clumps above the vibration range of the distortion coil spring, it is difficult to pulverize the clumps.

Thus, a method of simply inserting a coil member in the vertical conveying unit so as to make contact with the conveying screw due to its own weight and causing the coil member to oscillate in the vertical direction with rotation of the conveying screw may also be considered. However, when the coil member is brought into direct contact with the conveying screw, a screw blade portion may make contact with coil pieces at the lower end of the coil member to repel the coil pieces to produce noise. Further, the coil pieces may be caught in the conveying screw, and it may become difficult to perform satisfactory toner conveyance.

SUMMARY OF THE INVENTION

An object of the present invention is to provide a powder conveying device in which a conveying unit that conveys powder in a second direction different from a first direction is disposed at a rear end of a conveying unit that conveys the powder in the first direction by causing the powder to fall due to gravity, and which can reliably convey the powder without producing noise and to provide an image forming apparatus to which the powder conveying device is applied.

A powder conveying device according to an aspect of the present invention includes a first conveying unit, a second conveying unit, a conveying member, a powder pulverizing member, and a protective member. The first conveying unit is a conveyance path extending in a first direction and conveying powder by causing the powder to fall due to gravity, has an upper end and a lower end, and has a communication opening at the lower end. The second conveying unit is a powder conveyance path extending from one end to the other end in a second direction different from the first direction and communicates with the first conveying unit, with the communication opening thereof being connected to the one end side. The conveying member is disposed in the second conveying unit and includes a shaft member extending in an extension direction of the second conveying unit and a protruding portion formed around the shaft member, and this conveying member conveys the powder from the one end toward the other end by rotating around the shaft member. The powder pulverizing member is disposed in the first conveying unit so as to be able to oscillate in the first direction. The protective member is attached to a lower end portion of the powder pulverizing member so as to make contact with at least the protruding portion of the conveying member. A contact state between the protective member and the protruding portion changes according to a rotation angle of the rotation about the conveying member, and the protective member and the powder pulverizing member oscillate in the first direction according to a change in the contact state.

An image forming apparatus according to another aspect of the present invention includes the powder conveying device in which the powder is toner.

The objects, features, and advantages of the present invention will become more apparent upon reading the following detailed description and the accompanying drawings.

BRIEF DESCRIPTION OF THE DRAWINGS

FIGS. 9A and 9B are schematic views for explaining vertical oscillation of the cap.

DETAILED DESCRIPTION OF THE PREFERRED EMBODIMENTS

Hereinafter, an image forming apparatus 10 according to an embodiment of the present invention will be described in detail with reference to the drawings. In the present embodiment, a tandem-type color printer is illustrated as an example of the image forming apparatus. The image forming apparatus may be a copying machine, a facsimile machine, and a multi-function device including the functions of the copying machine and facsimile machine, for example. Further, in the present embodiment, a toner conveying device that conveys waste toner is illustrated as a powder conveying device according to the present invention.

Figure 1:
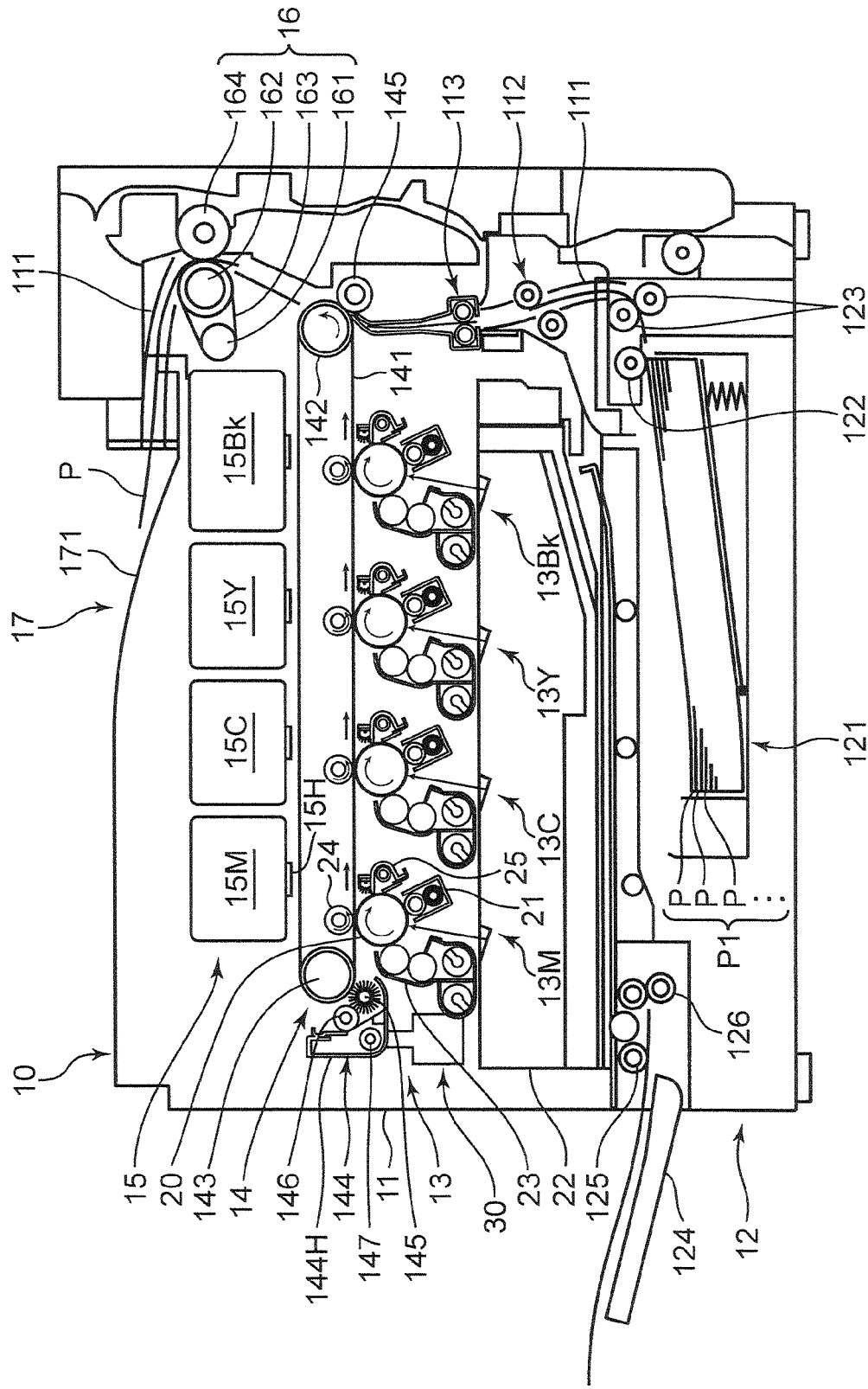
FIG. 1 is a cross-sectional view illustrating an internal structure of an image forming apparatus according to an embodiment of the present invention.

FIG. 1 is a cross-sectional view illustrating an internal structure of the image forming apparatus 10. The image forming apparatus 10 includes a main body 11 that has a box-shaped housing structure. The main body 11 includes a sheet feeding unit 12 that feeds a sheet P, an image forming unit 13 that forms a toner image to be transferred to the sheet P fed from the sheet feeding unit 12, an intermediate transfer unit 14 in which the toner image is primarily transferred, a toner supply unit 15 that supplies toner to the image forming unit 13, and a fixing unit 16 that performs a process of fixing a non-fixed toner image formed on the sheet P to the sheet P. Further, a sheet discharging unit 17 in which the sheet P having been subjected to the fixing process by the fixing unit 16 is provided above the main body 11.

An operation panel for operating to input output conditions or the like of the sheet P is provided at an appropriate position on the upper surface of the main body 11. The operation panel includes a power key, a touch panel for inputting output conditions, and various operation keys.

A sheet conveyance path 111 that extends in an up-down direction is formed in the main body 11 on the right side of the image forming unit 13. A conveyance roller pair 112 that conveys sheets is provided at an appropriate position of the sheet conveyance path 111. Moreover, a registration roller pair 113 that corrects skew of a sheet and delivers the sheet to a nip portion for secondary transfer described later at a predetermined time is provided upstream the nip portion of the sheet conveyance path 111. The sheet conveyance path 111 is a conveyance path that conveys the sheet P from the sheet feeding unit 12 to the sheet discharging unit 17 via the image forming unit 13 and the fixing unit 16.

The sheet feeding unit 12 includes a sheet feeding tray 121, a pickup roller 122, and a feed roller pair 123. The sheet feeding tray 121 is removably attached to a lower position of the main body 11 and stores a sheet bundle P1 in which a plurality of sheets P is stacked. The pickup roller 122 delivers one at a time the sheet P on top of the sheet bundle P1 stored in the sheet feeding tray 121 one by one. The feed roller pair 123 delivers the sheets P continuously delivered from the pickup roller 122 to the sheet conveyance path 111.

The sheet feeding unit 12 includes a manual sheet feeding unit that is attached to the left side surface illustrated in FIG. 1, of the main body 11. The manual sheet feeding unit includes a manual feed tray 124, a pickup roller 125, and a feed roller pair 126. The manual feed tray 124 is a tray on which a user manually places a sheet P. As illustrated in FIG. 1, when the user manually feeds the sheet P, the user opens the manual feed tray 124 from the side surface of the main body 11. The pickup roller 125 delivers one at a time the sheet P placed on the manual feed tray 124. The feed roller pair 126 delivers the sheet P delivered one at a time by the pickup roller 125 to the sheet conveyance path 111.

The image forming unit 13 is configured to form a toner image to be transferred to the sheet P and includes a plurality of image forming units that forms toner images of different colors. In the present embodiment, a magenta image forming unit 13M that uses magenta (M) developer, a cyan image forming unit 13C that uses cyan (C) developer, a yellow image forming unit 13Y that uses yellow (Y) developer, and a black image forming unit 13Bk that uses black (Bk) developer are sequentially arranged as the image forming units in that order from upstream to downstream (from left to right in FIG. 1) in the rotation direction of the intermediate transfer belt 141. The units 13M, 13C, 13Y, and 13Bk each include a photosensitive drum 20 and a charging device 21, a developing device 23, a primary transfer roller 24, and a cleaning device 25 which are disposed around the photosensitive drum 20. Moreover, an exposure device 22 shared by the respective units 13M, 13C, 13Y, and 13Bk is disposed under the image forming units.

The photosensitive drum 20 rotates about its shaft and an electrostatic latent image and a toner image are formed on its circumferential surface. A photosensitive drum that uses an amorphous silicon (a-Si) material can be used as the photosensitive drum 20. The charging device 21 uniformly charges the surface of the photosensitive drum 20. A contact charging device that includes a charging roller and a charge cleaning brush for removing toner adhering to the charging roller can be employed as the charging device 21. The exposure device 22 includes various optical devices such as a light source, a polygonal mirror, a reflecting mirror, or a deflecting mirror and irradiates the uniformly charged circumferential surface of the photosensitive drum 20 with light modulated based on image data to form an electrostatic latent image.

The developing device 23 supplies toner to the circumferential surface of the photosensitive drum 20 in order to develop the electrostatic latent image formed on the photosensitive drum 20. The developing device 23 uses two-component developer made up of toner and carrier and includes a stirring roller, a magnetic roller, and a developing roller. The stirring roller charges toner while stirring and circulating the two-component developer. A two-component developer layer is carried on the circumferential surface of the magnetic roller, and a toner layer is formed by the toner delivered due to a potential difference between the magnetic roller and the developing roller and is carried on the circumferential surface of the developing roller. The toner on the developing roller is supplied to the circumferential surface of the photosensitive drum 20 and the electrostatic latent image is developed.

The primary transfer roller 24 and the photosensitive drum 20 form a nip portion with the intermediate transfer belt 141 included in the intermediate transfer unit 14 interposed. The primary transfer roller 24 primarily transfers the toner image on the photosensitive drum 20 to the intermediate transfer belt 141. The cleaning device 25 cleans the circumferential surface of the photosensitive drum 20 after the toner image is transferred.

The intermediate transfer unit 14 is disposed in a space formed between the image forming unit 13 and the toner supply unit 15 and includes an intermediate transfer belt 141 and a driving roller 142 and a driven roller 143 that are rotatably supported by a unit frame (not illustrated). The intermediate transfer belt 141 is an endless belt-shaped rotating member and is stretched between the driving roller 142 and the driven roller 143 so that the circumferential surface thereof makes contact with the circumferential surfaces of the photosensitive drums 20. Rotational driving force is applied to the driving roller 142 and the driving roller 142 rotates with revolving of the intermediate transfer belt 141.

A belt cleaning device 144 (first container) that removes toner remaining on the circumferential surface of the intermediate transfer belt 141 is disposed near the driven roller 143. The belt cleaning device 144 includes a casing 144H in which a portion facing the driven roller 143 is open, and a brush roller 145, a collecting roller 146, and a collected toner conveying screw 147 disposed in the casing 144H.

The brush roller 145 is a roller in which a number of brush bristles are implanted on a rotation shaft thereof and the circumferential surface thereof makes contact with the surface of the intermediate transfer belt 141. The collecting roller 146 has a circumferential surface which is disposed so as to make contact with the circumferential surface of the brush roller 145 and electrostatically attracts and removes waste toner that the brush roller 145 scraped from the intermediate transfer belt 141. The waste toner adhering to the circumferential surface of the collecting roller 146 is scraped by blades and falls on the bottom of the casing 144H. The collected toner conveying screw 147 conveys the waste toner scraped from the circumferential surface of the collecting roller 146 toward the toner conveying device 30 described later.

A secondary transfer roller 145 is disposed so as to face the driving roller 142. The secondary transfer roller 145 makes pressure-contact with the circumferential surface of the intermediate transfer belt 141 to form a secondary nip portion. In the secondary nip portion, the toner image primarily transferred to the intermediate transfer belt 141 is secondarily transferred to the sheet P supplied from the sheet feeding unit 12.

The toner supply unit 15 stores toner used for image formation, and in the present embodiment, includes a magenta toner container 15M, a cyan toner container 15C, a yellow toner container 15Y, and a black toner container 15Bk. These toner containers 15M, 15C, 15Y, and 15Bk each store supply toner of the respective colors M, C, Y, and Bk, and supply toner of each color from a toner discharge port 15H formed on the bottom surface of the container to the developing devices 23 of the corresponding image forming units 13M, 13C, 13Y, and 13Bk through a toner conveying unit (not illustrated).

The fixing unit 16 includes a heating roller 161 that includes a heating source, a fixing roller 162 disposed to face the heating roller 161, a fixing belt 163 stretched between the fixing roller 162 and the heating roller 161, and a pressure roller 164 disposed to face the fixing roller 162 with the fixing belt 163 interposed to form a fixing nip portion. The sheet P supplied to the fixing unit 16 is heated and pressurized when the sheet P passes through the fixing nip portion. As a result, the toner image transferred to the sheet P at the secondary nip portion is fixed to the sheet P.

The sheet discharging unit 17 is formed in a depressed apex portion of the main body 11, and a sheet discharge tray 171 that receives the discharged sheet P is formed on a bottom of the depressed portion. The sheet P having been subjected to the fixing process is discharged toward the sheet discharge tray 171 via the sheet conveyance path 111 that is extended from the upper portion of the fixing unit 16.

Figure 2:
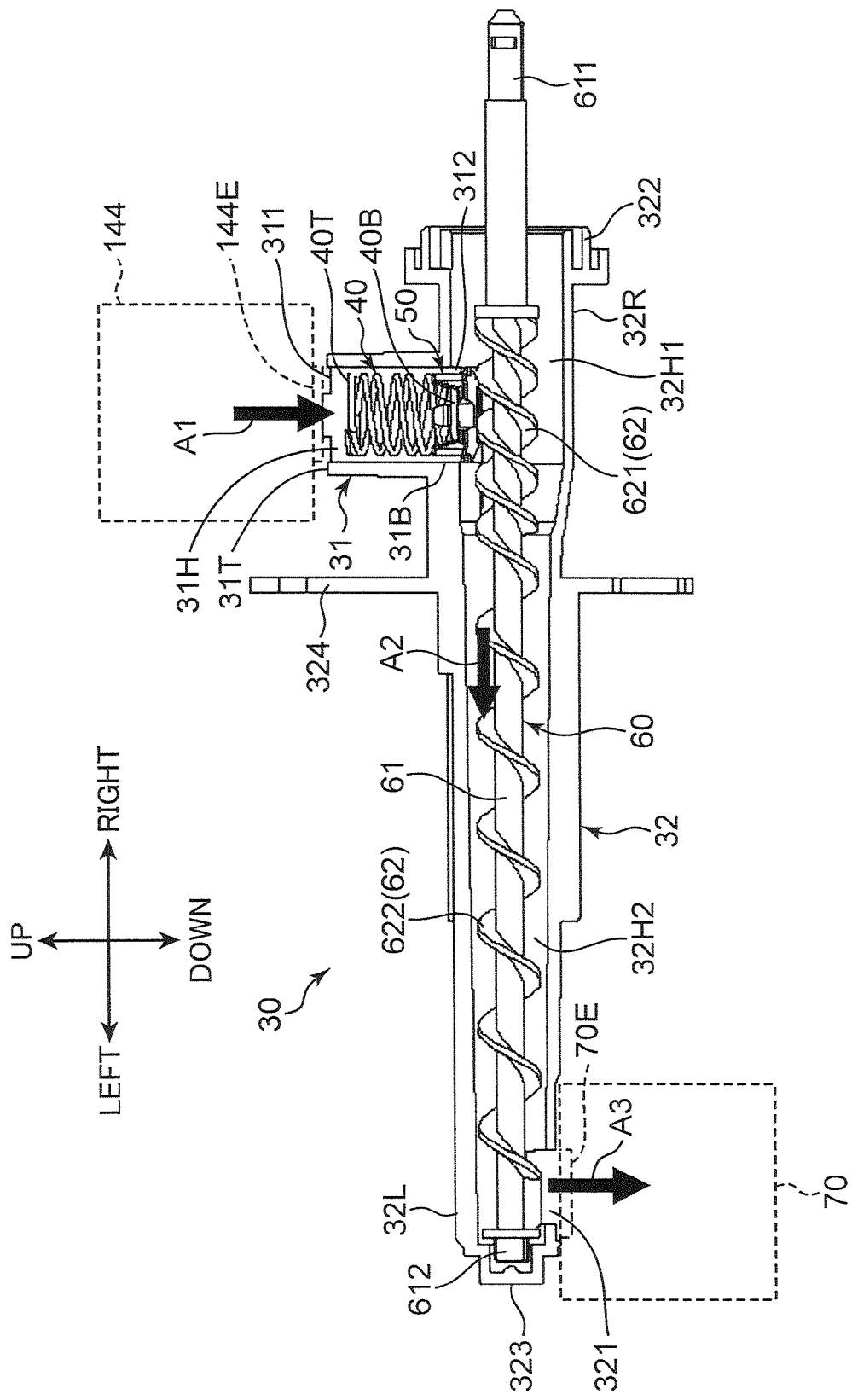
FIG. 2 is a cross-sectional view illustrating an embodiment of a toner conveying device (powder conveying device).
Figure 3:
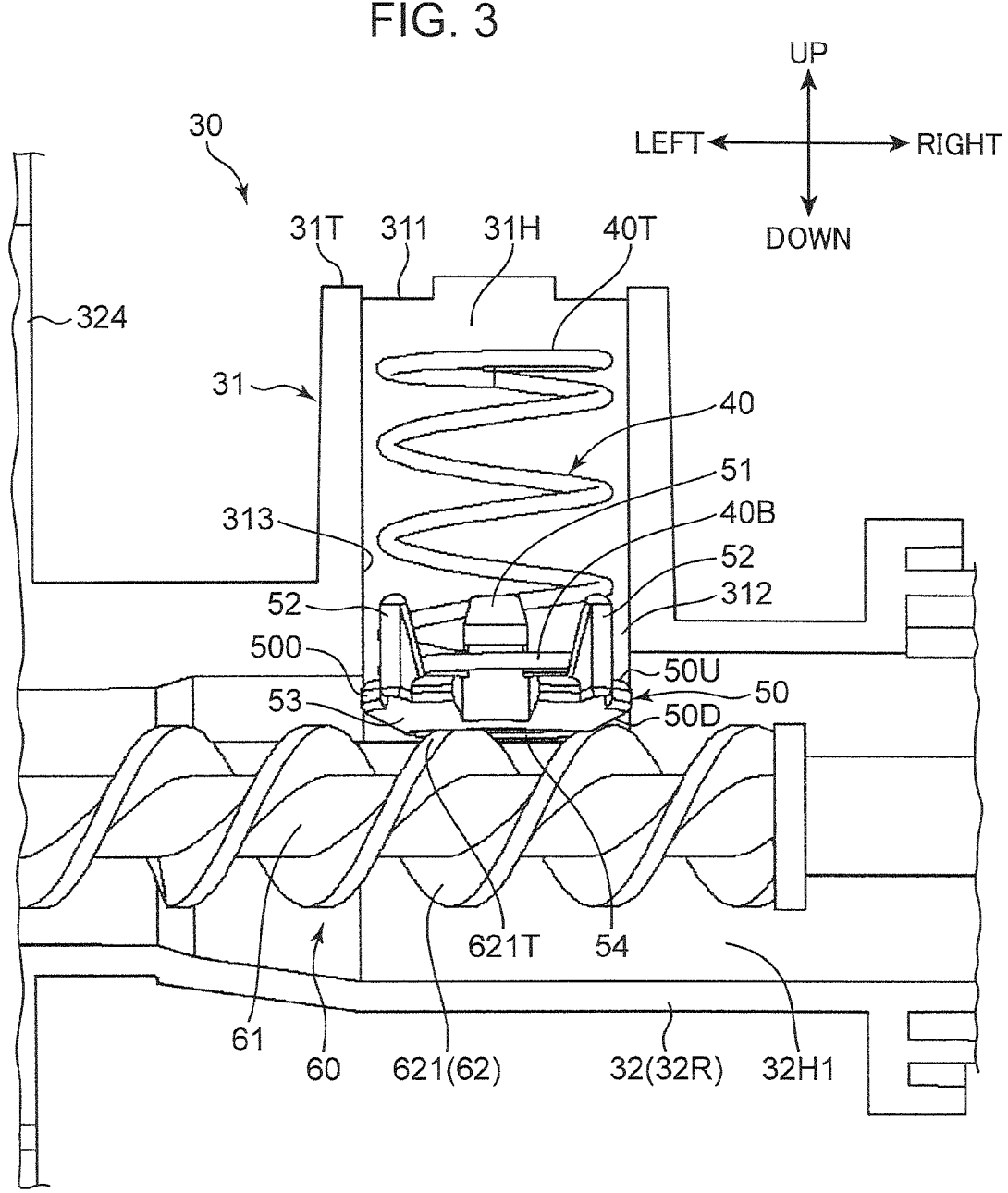
FIG. 3 is an enlarged cross-sectional view of a main part of FIG. 2.

FIG. 2 is a cross-sectional view illustrating the toner conveying device 30 (the powder conveying device) according to an embodiment of the present invention, and FIG. 3 is an enlarged cross-sectional view of a main part of FIG. 2. The toner conveying device 30 conveys waste toner collected from the surface of the intermediate transfer belt 141 by the belt cleaning device 144 up to a waste toner container 70 (second container: not illustrated in FIG. 1). That is, the belt cleaning device 144 (the casing 144H) includes a waste toner discharge port 144E (powder discharge port) for delivering waste toner, and the waste toner container 70 includes a waste toner receiving port 70E (powder receiving port) for receiving the waste toner. The toner conveying device 30 receives the waste toner delivered from the waste toner discharge port 144E as indicated by arrow A1 in FIG. 2, conveys the waste toner in the direction indicated by arrow A2, and supplies the waste toner to the waste toner container 70 through the waste toner receiving port 70E as indicated by arrow A3.

The toner conveying device 30 includes a vertical conveying unit 31 (first conveying unit), a horizontal conveying unit 32 (second conveying unit) connected to the lower end of the vertical conveying unit 31, a coil member 40 (powder pulverizing member) accommodated in the vertical conveying unit 31, a cap 50 (protective member) attached to the lower end portion of the coil member 40, and a conveying screw 60 (conveying member) disposed in the horizontal conveying unit 32.

The vertical conveying unit 31 is a conveyance path that extends in a vertical direction (first direction) from the upper end to the lower end and conveys waste toner by causing the same to fall due to gravity. The vertical conveying unit 31 includes a receiving opening 311 at its upper end 31T and a communication opening 312 at its lower end 31B. The upper end 31T faces the lower surface of the belt cleaning device 144, and the receiving opening 311 is connected to the waste toner discharge port 144E of the belt cleaning device 144. The waste toner freely falls in a conveyance space 31H of the vertical conveying unit 31 through the receiving opening 311. A cross-sectional shape of the vertical conveying unit 31 in a direction perpendicular to the waste toner conveying direction (the arrow A1 in the drawing) is rectangular (see FIG. 8).

The horizontal conveying unit 32 is a conveyance path for powder extending from the right end (one end) to the left end (the other end) in the horizontal direction (second direction). The horizontal conveying unit 32 includes a right region 32R that includes a right-side conveyance space 32H1 having a relatively large inner diameter and a left region 32L that includes a left-side conveyance space 32H2 having a relatively small inner diameter, communicating with the right-side conveyance space 32H1. The vertical conveying unit 31 is disposed on the upper surface of the right region 32R, and the communication opening 312 of the vertical conveying unit 31 is connected to the upper surface portion of the right-side conveyance space 32H1. Due to this, a state where the conveyance space 31H of the vertical conveying unit 31 and the right-side conveyance space 32H1 and left-side conveyance space 32H2 communicate (join) is created. A waste toner discharge opening 321 is formed on a lower surface near the left end portion of the left region 32L. A flange portion 324 for fixing the toner conveying device 30 to a frame included in the main body 11 is provided near the boundary between the right region 32R and the left region 32L.

The conveying screw 60 includes a screw shaft 61 (shaft member) that extends in the extension direction of the horizontal conveying unit 32 and a blade portion 62 (protruding portion) that is formed in a spiral form around the screw shaft 61. The conveying screw 60 rotates around the screw shaft 61 to convey waste toner from the right end to the other end as indicated by arrow A2 in FIG. 2. That is, the conveying screw 60 conveys the waste toner that freely falls from the communication opening 312 to the right-side conveyance space 32H1 toward the left-side conveyance space 32H2 so that the waste toner is discharged from the discharge opening 321.

A drive input portion 611 that receives the input of rotational driving force from a motor (not illustrated) is attached to the right side of the screw shaft 61. The drive input portion 611 is rotatably held by a bearing member (not illustrated) that is attached to a holding portion 322 on the right side of the horizontal conveying unit 32. That is, an opening on the right side of the horizontal conveying unit 32 is blocked by the bearing member (not illustrated). A left end portion 612 of the screw shaft 61 is rotatably supported by a support portion 323 formed at the left end of the horizontal conveying unit 32.

The blade portion 62 includes an upstream blade portion 621 positioned in the right region 32R and a downstream blade portion 622 positioned in the left region 32L. The upstream blade portion 621 and the downstream blade portion 622 have the same outer diameter but have different blade pitches. The upstream blade portion 621 has a relatively small blade pitch, and in a schematic cross-sectional view, blades corresponding to two pitches are fitted in the communication opening 312 of the vertical conveying unit 31. In contrast, the blade pitch of the downstream blade portion 622 is approximately twice that of the upstream blade portion 621. The upstream blade portion 621 has a low waste toner conveying speed but has strong conveying power. On the other hand, the downstream blade portion 622 can convey waste toner at a higher speed than the upstream blade portion 621.

Although the waste toner that freely falls from the communication opening 312 due to gravity falls and piles up in the right-side conveyance space 32H1, the upstream blade portion 621 reliably delivers the waste toner to the left-side conveyance space 32H2 with strong conveying power. Since the downstream blade portion 622 can convey the waste toner at a high speed, the waste toner may not stagnate near the boundary between both conveyance space 32H1 and 32H2. Thus, the waste toner is stably conveyed without being stagnated along such an L-shaped conveyance path that the horizontal conveying unit 32 is connected to the lower end of the vertical conveying unit 31.

The coil member 40 is a coil spring member that is disposed in the conveyance space 31H of the vertical conveying unit 31 so as to be able to oscillate in the vertical direction and is a member disposed to scrape off the waste toner adhering to an inner wall surface 313 of the vertical conveying unit 31. The waste toner may adhere to the inner wall surface 313 by scattering during the free falling. In particular, waste toner has poor mobility and is likely to stagnate on the inner wall surface 313 once it adheres to the surface. Such adhering waste toner is scraped off by the vertical oscillation of the coil member 40. The coil member 40 is accommodated in the conveyance space 31H so that a first end portion 40T which is one end portion of the coil turn is positioned at the upper end 31T of the vertical conveying unit 31 and a second end portion 40B which is the other end portion is positioned at the lower end 31B.

The length of the coil member 40 is slightly smaller than the length in the up-down direction of the vertical conveying unit 31. This is because the coil member 40 oscillates in the vertical direction in the vertical conveying unit 31. Moreover, the outer diameter of the coil member 40 is slightly smaller than the width of the conveyance space 31H, and a gap is present between the outer circumference of the coil and the inner wall surface 313. If such a gap is not present, it is difficult for the coil member 40 to freely oscillate in the vertical direction. The coil member 40 is a member ideal as a waste toner pulverizing member in that it can be formed without using a mold or the like, that it has a hollow portion serving as the passage of waste toner, and that the shape with a gap between coil turns is ideal for scraping off the waste toner adhering to the inner wall surface 313 of the vertical conveying unit 31.

The cap 50 is a member that is attached to the second end portion 40B (lower end portion) of the coil member 40 and makes contact with the blade portion 62 of the conveying screw 60. Due to this, the coil member 40 and the conveying screw 60 can be prevented from directly making contact with each other. The cap 50 is formed from resin or metal that has satisfactory sliding properties with respect to the blade portion 62.

Figure 10:
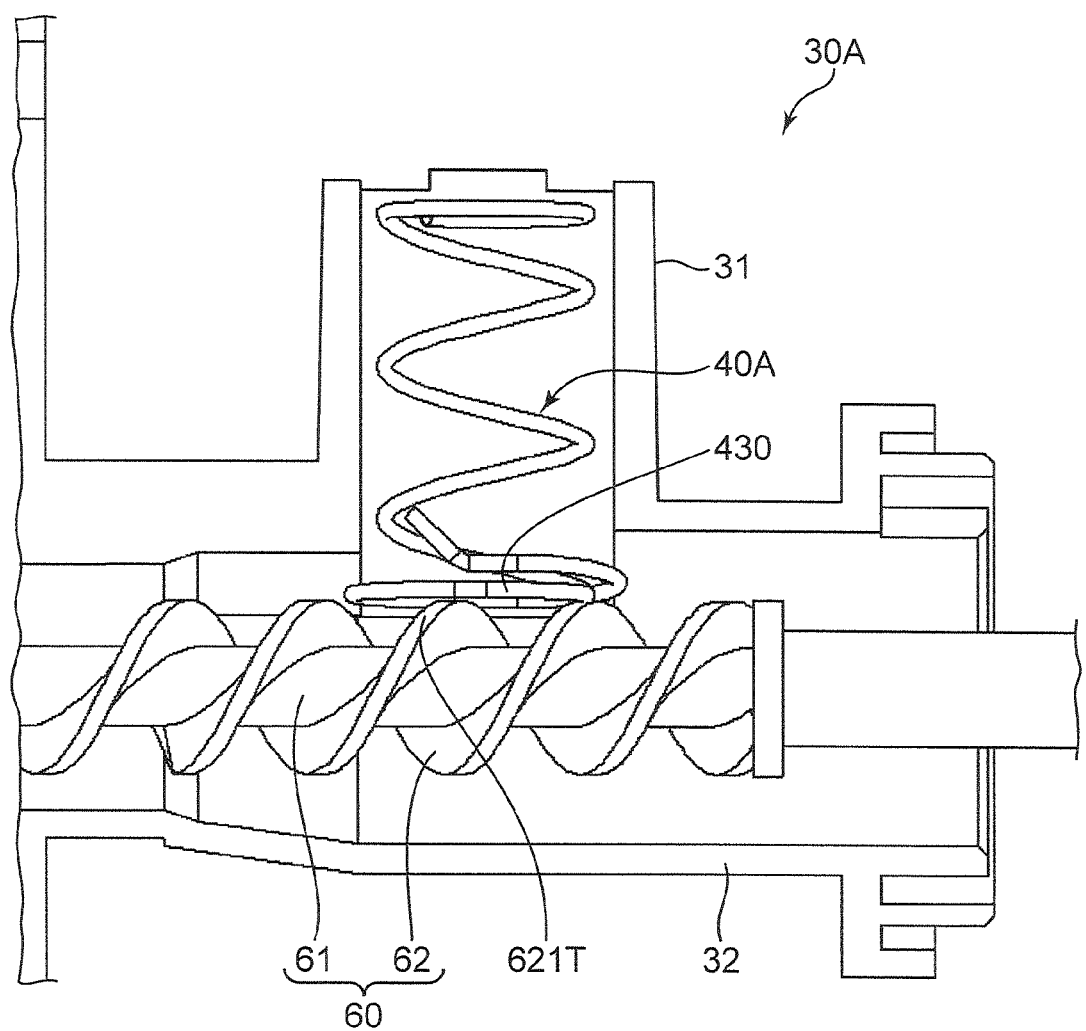
FIG. 10 is a cross-sectional view illustrating a comparative example of the toner conveying device.

Referring to FIG. 10, the effect of the cap 50 attached to the coil member 40 will be described. FIG. 10 is a cross-sectional view illustrating a toner conveying device 30A according to a comparative example. The toner conveying device 30A has a configuration in which a coil member 40A is simply inserted in a vertical conveying unit 31, and a lower end portion 430 of the coil member 40A makes contact with a conveying screw 60 due to its own weight. The lower end portion 430 is subjected to such processing that the lower end portion 430 has satisfactory contacting properties with respect to a blade portion 62 (outer circumferential surface 621T) of the conveying screw 60. When the conveying screw 60 rotates around the screw shaft 61, the contact state between the blade portion 62 and the lower end portion changes depending on the rotation angle and the coil member 40A oscillates in the vertical direction.

However, it is difficult to process the lower end portion 430 so as to stably make contact with the blade portion 62 for a long period. For example, if the flatness of the lower end portion 430 is not sufficient, that is, if part of the coil pieces of the lower end portion 430 is folded downward, the folded portion is repelled by the blade portion 62, and noise may be produced. Moreover, the coil pieces may be caught in the conveying screw 60 and the coil pieces may be sandwiched in the gap between an outer circumferential surface 621T of the blade portion 62 and the horizontal conveying unit 32. As a result, it may become difficult to perform satisfactory toner conveyance.

In the present embodiment, in order to solve the problem, the cap 50 is attached to the second end portion 40B of the coil member 40 so that a state where the coil member 40 stably makes contact with the conveying screw 60 through the cap 50 can be secured. The contact state between the cap 50 and the outer circumferential surface 621T of the blade portion 62 changes depending on the rotation angle of the conveying screw 60 around the screw shaft 61. Due to a change in the contact state, the cap 50 and the coil member 40 oscillate integrally in the vertical direction.

Figure 4:
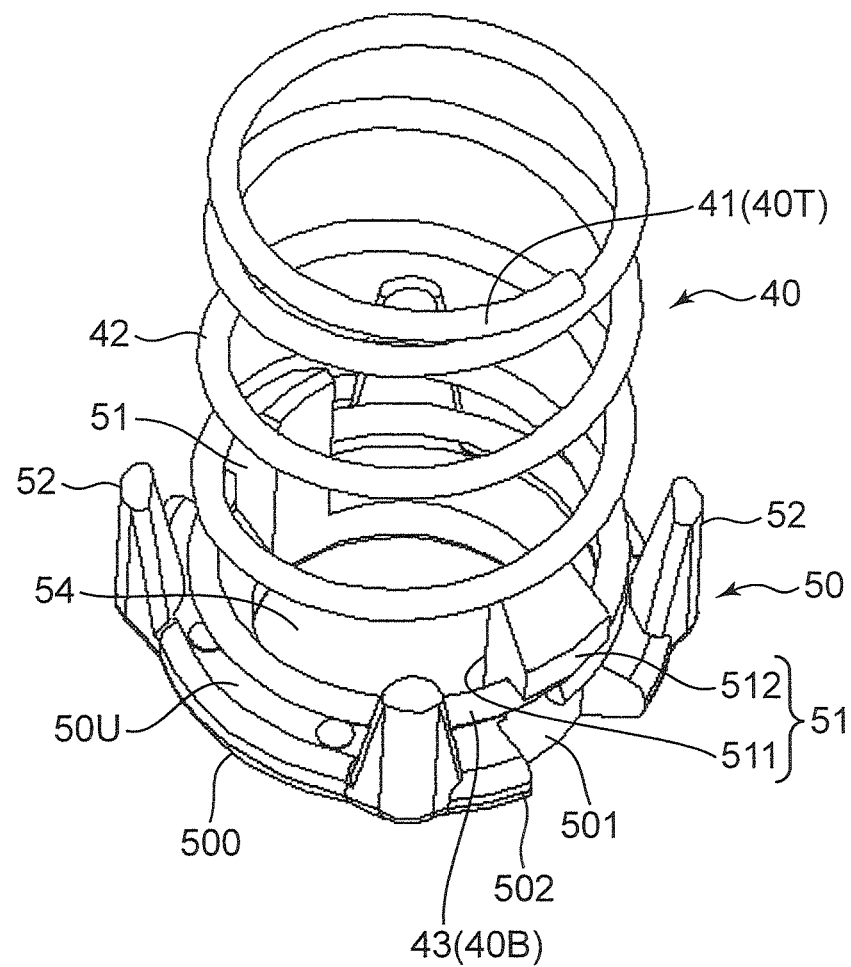
FIG. 4 is a perspective view of a coil member and a cap (protective member).
Figure 5:
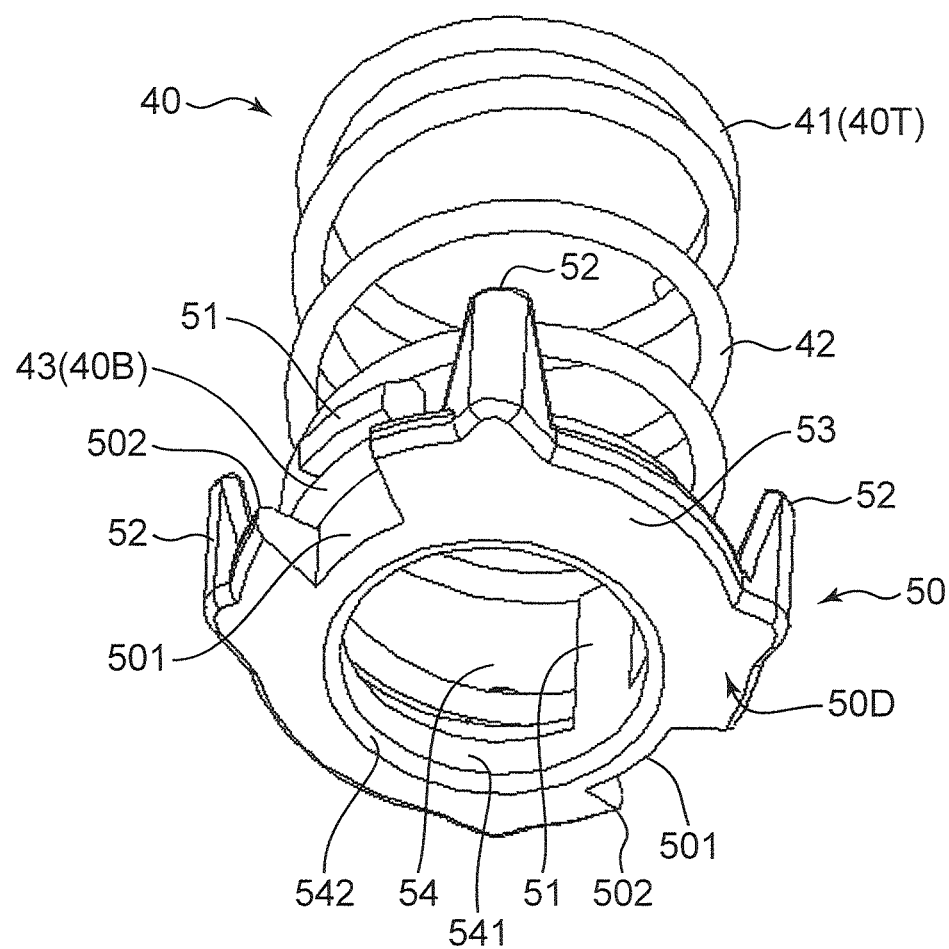
FIG. 5 is a perspective view of the coil member and the cap at a different angle.
Figure 6:
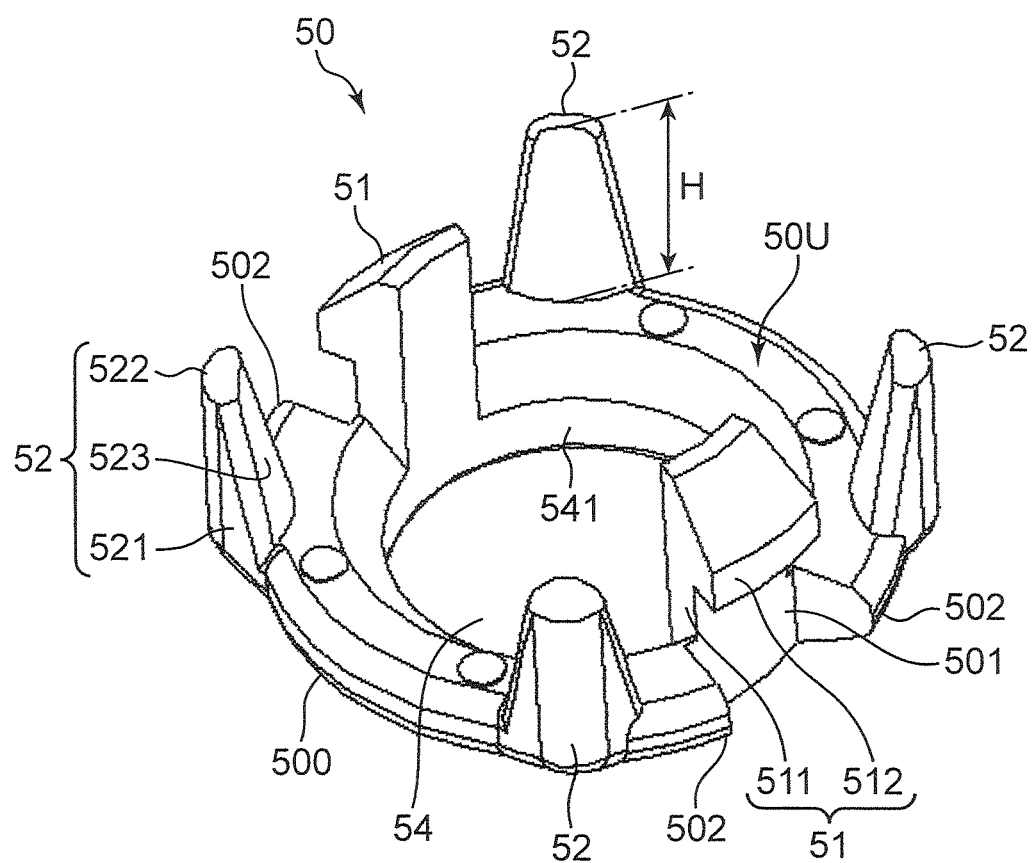
FIG. 6 is a perspective view of the cap only.
Figure 7:
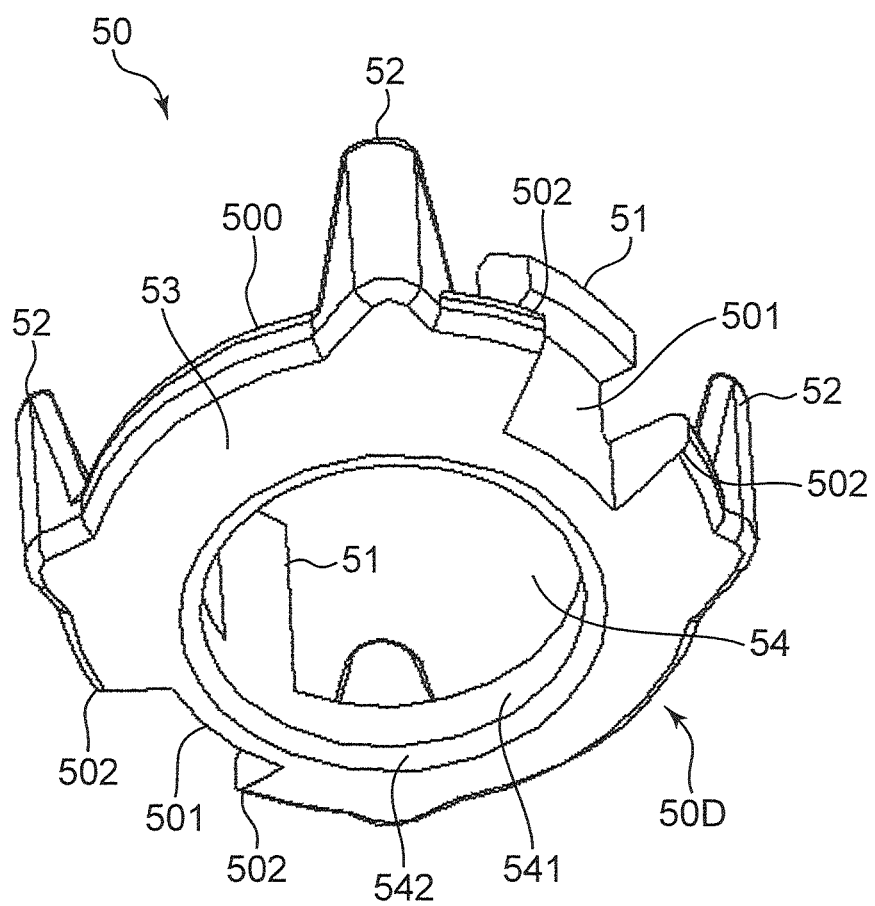
FIG. 7 is a perspective view of the cap only at a different angle.
Figure 8:
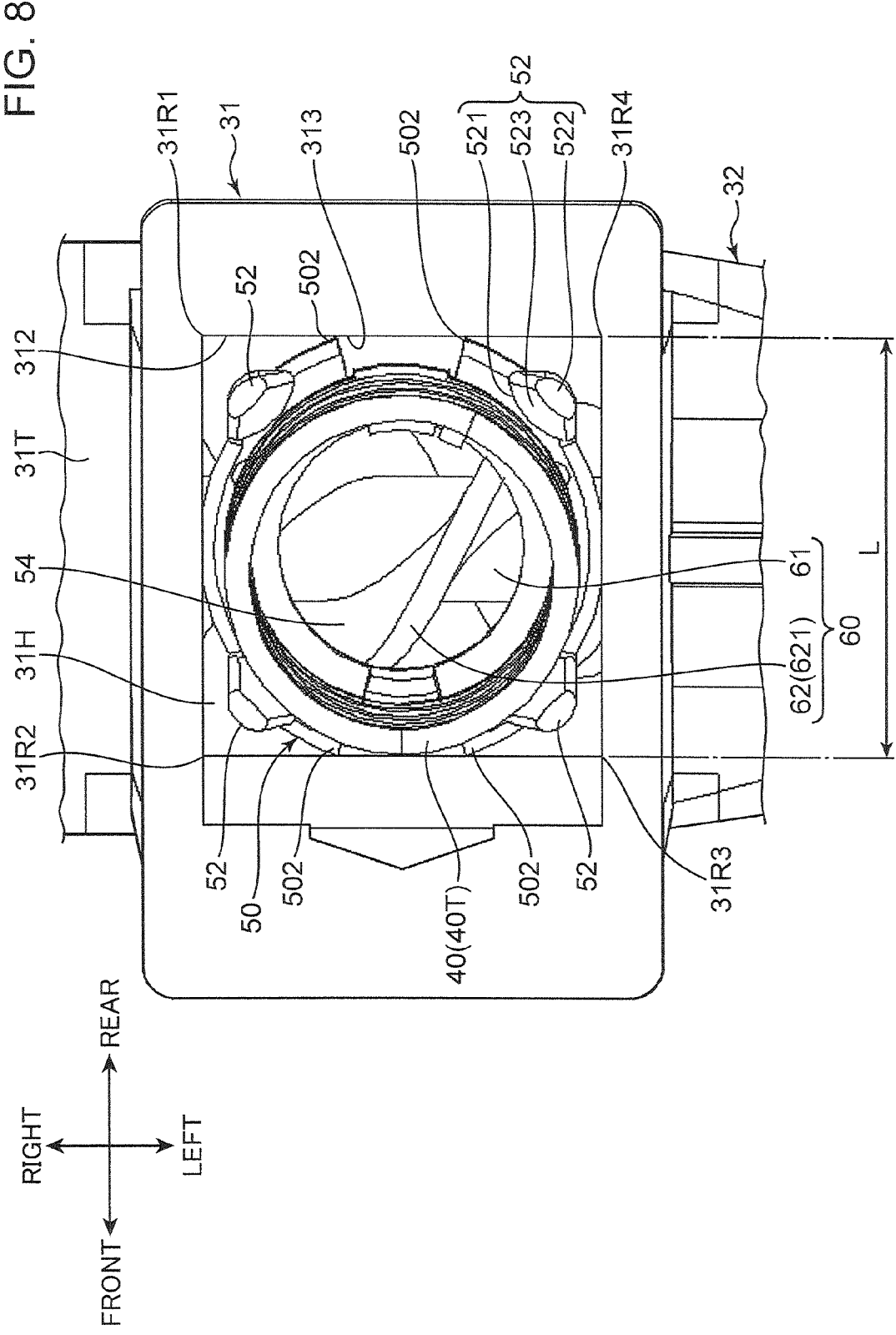
FIG. 8 is a top view of a vertical conveying unit.

Hereinafter, a detailed structure of the coil member 40 and the cap 50 will be described with reference to FIG. 4 to FIGS. 9A and 9B as well as FIG. 3. FIGS. 4 and 5 are perspective views of the coil member 40 and the cap 50 at reversed perspective angles, and FIGS. 6 and 7 are perspective views of the cap 50 only at reversed perspective angles. FIG. 8 is a top view of the vertical conveying unit 31. FIGS. 9A and 9B are schematic views for explaining vertical oscillation of the cap 50.

The coil member 40 is a circular coil member and includes an upper-end coil piece 41 positioned at the first end portion 40T, a coil body portion 42 extending downward from the upper-end coil piece 41 in a spiral form, and a lower-end coil piece 43 positioned at the second end portion 40B. The upper-end coil piece 41 and the lower-end coil piece 43 are subjected to flattening such that the coil pieces form flat surfaces parallel to the horizontal surface. The cap 50 is attached to the coil member 40 in such a manner that it is locked to the lower-end coil piece 43.

The cap 50 includes a cap body 500, and the cap body 500 includes an upper surface 50U (first surface) that faces the second end portion 40B of the coil member 40 and a lower surface 50D (second surface) that faces the blade portion 62 of the conveying screw 60. The cap 50 further includes two engaging members 51 (engaging portions) and four guiding members 52 formed on the upper surface 50U and a contacting surface 53 formed on the lower surface 50D. The cap 50 is positioned near a joining portion (the communication opening 312) between the vertical conveying unit 31 and the horizontal conveying unit 32.

The cap body 500 is an annular member that has a cylindrical inner wall surface 541 in a central region thereof, and due to this, has a circular through-hole 54 (central opening). In the present embodiment, although the through-hole 54 is illustrated, it is not always necessary to form a penetrating hole in the cap body 500, and the through-hole 54 may be a depression as long as the central region of the contacting surface 53 is open. A tapered portion 542 of which the diameter increases as it advances downward is formed in a lower edge portion of the inner wall surface 541. The through-hole 54 has an opening size such that a portion of the blade portion 62 of the conveying screw 60 can be inserted in the through-hole 54. This will be described in detail based on FIGS. 9A and 9B. The cap body 500 is always positioned lower than the communication opening 312 even when the cap body 500 oscillates in the vertical direction.

The engaging members 51 are members that engage with the lower-end coil piece 43 of the coil member 40. The two engaging members 51 are arranged at an interval of 180° in the circumferential direction so as to protrude from the upper surface 50U of the cap body 500. Each engaging member 51 includes a standing portion 511 and a claw portion 512 formed on the protruding end of the standing portion 511. The standing portion 511 is a planar member that is extended vertically upward from a side of the upper surface 50U closer to the inner wall surface 541. The claw portion 512 is a member that extends outward in the radial direction further from the outer circumferential surface of the standing portion 511. As illustrated in FIGS. 4 and 5, the lower-end coil piece 43 is locked in such a manner that it is sandwiched between the upper surface 50U and the lower surface of the claw portion 512.

Notch portions 501 are formed in portions of the cap body 500 corresponding to the claw portions 512 in order to demold the claw portions 512. Interfering portions 502 that protrude outward in the radial direction are formed on an opening edge of the notch portion 501. As illustrated in FIG. 8, the length between the front interfering portion 502 and the rear interfering portion 502 is approximately the same as the length L in the front-rear direction of the communication opening 312 of the vertical conveying unit 31. The inner wall surface 313 of the vertical conveying unit 31 has a demolding slope that widens slightly upward. An assembly of the coil member 40 and the cap 50 manufactured in the factory is inserted from the receiving opening 311, and the cap body 500 having the interfering portions 502 can pass through the communication opening 312. However, after that, in most cases, since the interfering portions 502 interfere with the inner wall surface (edge of the wall surface that forms the communication opening) of the horizontal conveying unit 32 present in the circumferential edge of the communication opening 312, the assembly of the coil member 40 and the cap 50 can be prevented from being removed from the receiving opening 311.

The guiding member 52 is a member that restricts the moving direction of the cap 50 (the cap body 500) substantially to the vertical direction only. In the present embodiment, an example where four guiding members 52 are arranged at an equal interval in the circumferential direction of the annular cap body 500 so as to protrude upward from the upper surface 50U is illustrated. Each guiding member 52 is a protruding structure that includes a base portion 521 that protrudes outward in the radial direction further from the outer circumferential edge of the cap body 500 and extends vertically upward from the base portion 521. The guiding member 52 further includes a distal end portion 522 which is a distal end of the protruding structure and a slope surface 523 that is formed on the inner circumference of the guiding member 52 so as to extend from the distal end portion 522 toward the base portion 521 (see FIG. 6).

As illustrated in FIG. 3, the cap body 500 is positioned below the communication opening 312. On the other hand, the guiding member 52 protrudes upward so as to be inserted in the vertical conveying unit 31. A protruding height H (see FIG. 6) of the guiding member 52 from the upper surface 50U is set such that the guiding member 52 can always interfere with a lower end portion of the inner wall surface 313 of the vertical conveying unit 31 in a vertical oscillation range of the coil member 40. That is, the guiding member 52 has a protruding height H such that the lower end portion of the inner wall surface 313 can make contact with at least a portion of the guiding member 52 near the distal end portion 522 even when the cap 50 is moved down to the lowest position. Due to such a guiding member 52, a horizontal movement of the assembly of the cap 50 and the coil member 40 is restricted in the entire vertical oscillation range of the coil member 40. Thus, it is possible to cause the assembly to oscillate substantially in the vertical direction only.

Referring to FIG. 8, a cross-sectional shape of the conveyance space 31H of the vertical conveying unit 31 in a direction perpendicular to a toner conveying direction (powder conveying direction) is approximately square. On the other hand, the coil member 40 is a circular coil member. Thus, an approximately triangular gap viewed from above is formed between the outer circumferential surface of the coil member 40 and the four corner portions 31R1, 3182, 31R3, and 31R4 of the conveyance space 31H. The outer circumferential surface of the coil member 40 is not in contact with the inner wall surface 313 in the approximately triangular gap region, and the waste toner adhering to the inner wall surface 313 cannot be scraped off.

Thus, in the present embodiment, the respective guiding members 52 are arranged so as to protrude between the outer circumferential surface of the coil member 40 and each of the four corner portions 31R1, 31R2, 31R3, and 31R4. Due to this, the approximately triangular gap regions can be filled up by the guiding members 52, and stagnation of the waste toner near the four corner portions 31R1 to 31R4 can be suppressed. That is, the guiding members 52 oscillate vertically with the vertical oscillation of the cap 50, and the waste toner stagnating near the four corner portions 31R1 to 31R4 can be scraped off.

As described above, the base portion 521 of the guiding member 52 protrudes outward in the radial direction further from the outer circumferential edge of the cap body 500. The protruding length of the base portion 521 is larger than that of the interfering portion 502. On the other hand, the length L in the front-rear direction (left-right direction) of the communication opening 312 is approximately equal to the length of a portion of the cap body 500 in which the interfering portion 502 is present. Thus, when rotational force around the central axis of the coil member 40 is applied to the cap 50, the guiding members 52 interfere with the inner wall surface 313 near the four corner portions 31R1 to 31R4. Therefore, the assembly of the cap 50 and the coil member 40 can be prevented from rotating around the central axis of the coil member 40. As a result, the function of the interfering portion 502 retaining the cap 50 in the vertical direction is strengthened.

That is, the cross-sectional shape of the right-side conveyance space 32H1 of the horizontal conveying unit 32 in a direction perpendicular to the screw shaft 61 is circular. Thus, the sides in the front-rear direction of the communication opening 312 are linear sides, and the sides in the left-right direction are curved sides that are upwardly convex. When the cap 50 is disposed so that the interfering portions 502 are positioned on the curved sides, the cap 50 can be tilted greatly by an amount corresponding to the convex curvature. Thus, there is a concern that the cap 50 passes through the communication opening 312 and is removed upward. Taking this into consideration, the cap 50 is disposed so that the interfering portions 502 are positioned on the linear sides in the front-rear direction. Such an arrangement state of the cap 50 is maintained by the guiding members 52 acting as a rotation stopper.

The contacting surface 53 is a portion that makes contact with the outer circumferential surface 621T only of the blade portion 62 of the conveying screw 60. The contacting surface 53 is formed on the lower surface 50D of the cap body 500 and has an annular shape similarly to the cap body 500. The contacting surface 53 is not a flat surface but a slope surface inclined in such a direction that it is generally convex downward. Since the central region of the contacting surface 53 is not present due to the through-hole 54, the contacting surface 53 forms an arc-shaped tapered surface that is narrowed as it advances toward the lower end. The outer circumferential surface 621T of the blade portion 62 is a curved surface that is curved in a spiral form. The contacting surface 53 can smoothly make sliding contact with such a curved surface. Thus, it is possible to suppress production of noise due to the contact between the cap 50 and the conveying screw 60. Moreover, it is possible to suppress an increase in the rotation load of the conveying screw 60.

The through-hole 54 performs a role of receiving a portion of the blade portion 62 of the conveying screw 60 to thereby cause the vertical oscillation of the cap 50. Since the horizontal movement of the cap 50 is restricted by the guiding members 52, the cap 50 makes contact with the blade portion 62 at a fixed point in the axial direction of the conveying screw 60. Thus, when the conveying screw 60 rotates around the screw shaft 61, the contact state between the cap 50 and the blade portion 62 which is a spiral curved plate changes naturally with a change in the phase of the blade portion 62. That is, the contact point between the contacting surface 53 and the outer circumferential surface 621T of the blade portion 62 changes with rotation of the conveying screw 60. Further, the inserted state of the blade portion 62 in the through-hole 54 also changes. That is, due to a phase difference of the blade portion 62 with the rotation of the conveying screw 60, the insertion depth of the blade portion 62 in the through-hole 54 which faces the fixed position of the conveying screw 60 in the axial direction thereof changes. Due to this, the assembly of the cap 50 and the coil member 40 can smoothly oscillate in the vertical direction.

FIGS. 9A and 9B are schematic diagrams for explaining vertical oscillation of the cap 50.

FIG. 9A illustrates a state where the blade portion 62 is not substantially inserted in the through-hole 54. This state illustrates a case where a rotational angle of the conveying screw 60 is such an angle that the through-hole 54 faces the adjacent pitches (a trough between blades) of the blade portion 62. That is, the blade pitch of the upstream blade portion 621 is approximately the same as the outer diameter of the through-hole 54. In this state, the outer circumferential surfaces 621T of the adjacent blades of a unit pitch of the blade portion 62 make contact with the left and right portions of the contacting surface 53 of the cap 50 as seen in the cross-sectional direction of FIG. 3. Thus, the blade portion 62 is not inserted in the through-hole 54, and as a result, a state where the cap 50 is lifted upward is created.

When the conveying screw 60 is half-rotated from the state of FIG. 9A, a portion of one blade of a unit pitch of the blade portion 62 is inserted in the through-hole 54 as shown in FIG. 9B. That is, the phase of the blade portion 62 changes with rotation of the conveying screw 60, and the outer circumferential surface 621T is gradually inserted in the through-hole 54. In this case, since the tapered portion 542 (see FIGS. 5 and 7) is formed on the inner wall surface 541 that defines the through-hole 54, sliding properties are satisfactory and no noise is produced. With the action of the through-hole 54 and the blade portion 62, the cap 50 oscillates vertically by a height of Δh with rotation of the conveying screw 60. It is sufficient for the protruding height H of the guiding member 52 to be at least larger than Δh.

Further, the through-hole 54 also contributes to passing of waste toner that falls through the vertical conveying unit 31. If the cap 50 does not have the through-hole 54, the passage for waste toner is greatly limited. However, in the present embodiment, since the through-hole 54 is formed in the central portion of the cap 50, the waste toner can fall through the horizontal conveying unit 32 along the through-hole 54. In particular, since the through-hole 54 is positioned immediately above the conveying screw 60, the waste toner falls in a region where the waste toner easily receives the conveying force of the conveying screw 60. Thus, the conveying properties of waste toner become satisfactory.

Moreover, the waste toner scraped off from the four corner portions 31R1 to 31R4 of the conveyance space 31H is guided toward the through-hole 54 by the slope surface 523 of the guiding member 52. The slope surface 523 is a surface that is inclined from the distal end portion 522 toward the base portion 521 so as to gradually approach the center of the through-hole 54. Thus, the waste toner scraped from the inner wall surface 313 by the oscillation of the guiding member 52 slides and falls along the slope surface 523 and falls in the horizontal conveying unit 32 through the through-hole 54. As a result, the conveying properties of waste toner can become more satisfactory.

The cap 50 is preferably formed from a resin material from the perspective of making it easy to manufacture by metal molding. For example, polyacetal having excellent toner-resistance can be used as a molding resin material. Although the conveying screw 60 is preferably formed from a resin material, it is preferable to use a resin material different from the cap 50. For example, polybutylene terephthalate is ideal as a molding resin material of the conveying screw 60. When the cap 50 and the conveying screw 60 that make contact with each other are formed from the same material, rumbling sound, shaving, or the like caused by friction may occur easily. However, such a problem can be relieved by using different materials.

According to the toner conveying device 30 described above, the coil member 40 that scrapes waste toner off the inner wall surface 313 of the vertical conveying unit 31 makes contact with the conveying screw 60 with the cap 50 interposed. Moreover, when the conveying screw 60 rotates axially, since the coil member 40 oscillates in the vertical direction, stagnation of the waste toner in the vertical conveying unit 31 is prevented. Moreover, since the cap 50 makes contact with the blade portion 62 rather than the coil member 40 directly making contact with the conveying screw 60, a contact state where noise can be rarely produced can be created stably.

While an embodiment of the present invention has been described in detail, the present invention is not limited to this. The present invention may take the following modifications, for example.

(1) In the embodiment, the toner conveying device 30 that conveys waste toner from the belt cleaning device 144 to the waste toner container 70 has been illustrated as an example of a powder conveying device. However, this is an example when the present invention is applied to an image forming apparatus, and for example, the powder conveying device may be a toner conveying device that conveys new toner from the toner supply unit 15 to the developing device 23.

(2) In the embodiment, the circular coil member 40 has been illustrated as an example of a powder pulverizing member. However, this is an example, and for example, a triangular or rectangular coil member or a powder pulverizing member having such a form that projections or ribs are extended in a radial form from a vertically extending core may be used.

(3) In the embodiment, the toner conveying device 30 in which one horizontal conveying unit 32 is connected to the lower end of one vertical conveying unit 31 has been illustrated. However, another conveying unit may be connected to an upstream or downstream end of these conveying units in addition to the horizontal conveying unit 32 connected to the lower end of the vertical conveying unit 31.

(4) In the embodiment, the vertical conveying unit 31 extending in the vertical direction has been illustrated as a first conveying unit and the horizontal conveying unit 32 extending in the horizontal direction has been illustrated as a second conveying unit. However, such a conveying unit is an example, and the conveying directions of the first and second conveying units are not intended to be limited to the vertical and horizontal directions. The vertical conveying unit 31 may only need to be a conveyance path capable of conveying powder by causing the powder to fall using the action of gravity, and may be a conveying unit that is inclined by a predetermined angle from the vertical direction. Moreover, the horizontal conveying unit 32 may be a conveying unit that is inclined upward or downward by a predetermined angle with respect to the horizontal direction. Further, the first and second conveying units are not limited to a linear conveyance path and may be a slightly curved conveyance path.

(5) In the embodiment, toner has been illustrated as conveying target powder. However, this is an example, and the present invention can be applied to all types of powder. For example, powder for industrial use or for food, very small particles, and the like can also be conveying target powder.

As described above, according to the present invention, it is possible to provide a powder conveying device in which a second conveying unit that conveys powder in a second direction different from a first direction and includes a conveying member is connected to a rear end of a conveying unit that conveys powder in the first direction by causing the powder to fall due to gravity, and which can prevent production of noise and can convey powder smoothly.

The invention claimed is:

1. A powder conveying device comprising:
   a first conveying unit defining a conveyance path extending in a first direction and conveying powder by causing the powder to fall due to gravity, and which has an upper end and a lower end, and moreover which has a communication opening at the lower end;
   a second conveying unit defining a powder conveyance path extending from one end to the other end in a second direction different from the first direction, and that communicates with the first conveying unit, with the communication opening thereof being connected to the one end side;
   a conveying screw that is disposed in the second conveying unit and includes a shaft member extending in an extension direction of the second conveying unit and a blade portion formed around the shaft member in a spiral form and conveying the powder from the one end toward the other end by rotating around the shaft member;
   a coil member which is disposed in the first conveying unit so as to be able to oscillate in the first direction, the coil member being accommodated in the first conveying unit and having opposite first and second end portions, the first end portion being positioned at the upper end and the second end portion being positioned at the lower end; and
   a protective member attached to the second end portion of the coil member so as to make contact with at least the blade portion of the conveying screw, the protective member including a first surface that faces the second end portion of the coil member and a second surface that faces the blade portion, an engaging portion formed on the first surface side and engaging with a coil piece in the second end portion of the coil member, a contacting surface formed on the second surface side and making contact with the blade portion of the coil member, the contacting surface having a slope surface that is inclined in a direction in which a convex is formed downward in the slope surface, wherein
   a contact state between the protective member and the blade portion changes according to a rotation angle of the rotation about the conveying screw, and the protective member and the coil member oscillate in the first direction according to a change in the contact state.

2. The powder conveying device according to claim 1, wherein
   the protective member further includes a central opening that is open in a central region of the contacting surface, and
   the central opening has an opening size such that a portion of the blade portion can be inserted therein.

3. The powder conveying device according to claim 1, wherein
   the protective member further includes a guiding member that protrudes upward from the first surface, and
   the guiding member has a protruding height such that the guiding member can interfere with a portion of an inner wall of the first conveying unit in an oscillation range in the first direction of the coil member.

4. The powder conveying device according to claim 3, wherein
   the first conveying unit has a rectangular cross-sectional shape in a direction perpendicular to a powder conveying direction and the coil member is a circular coil member, and the guiding member is disposed so as to protrude between each of four corner portions of the first conveying unit and a circumferential surface of the coil member.

5. The powder conveying device according to claim 4, wherein
the guiding member has a slope surface that guides the powder toward the central opening.

6. The powder conveying device according to claim 1, wherein
the protective member further includes an interfering portion that interferes with an edge of a wall surface that forms the communication opening of the first conveying unit.

7. The powder conveying device according to claim 1, further comprising:
a first container that has a powder discharge port and delivers the powder; and
a second container that has a powder receiving port and receives the powder, wherein
the first conveying unit has at the upper end a receiving opening configured to receive the powder, and the receiving opening is connected to the powder discharge port of the first container, and
the second conveying unit has at the other end a discharge opening configured to discharge the powder, and the discharge opening is connected to the powder receiving port of the second container.

8. The powder conveying device according to claim 1, wherein
the first conveying unit is a vertical conveyance path that extends in a vertical direction, and
the second conveying unit is a horizontal conveyance path that extends in a horizontal direction.

9. The powder conveying device according to claim 7, wherein
the powder is toner.

10. An image forming apparatus comprising:
the powder conveying device according to claim 9; and
an image forming unit that forms a toner image on a sheet.

* * * * *